(12) United States Patent
Jacobus

(10) Patent No.: US 6,754,638 B1
(45) Date of Patent: Jun. 22, 2004

(54) WEB SITE OFFERING SPECIALTY CHEMICALS SUCH AS ADHESIVES SEALANTS COATINGS LUBRICANTS CLEANERS AND RELATED EQUIPMENT IN CONJUNCTION WITH ACCESS TO PRODUCT SUPPORT AND PRODUCT USAGE INFORMATION

(75) Inventor: Pattie Smith Jacobus, West Simsbury, CT (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 09/573,104

(22) Filed: May 17, 2000

(51) Int. Cl.[7] .............................................. G06F 17/60
(52) U.S. Cl. ........................................... 705/27; 705/26
(58) Field of Search .................................... 705/26, 27

(56) References Cited

U.S. PATENT DOCUMENTS

| | | | | |
|---|---|---|---|---|
| 4,992,940 A | * | 2/1991 | Dworkin ...................... | 705/26 |
| 5,214,343 A | * | 5/1993 | Baumoel ..................... | 310/334 |
| 5,970,472 A | * | 10/1999 | Allsop et al. ................. | 705/26 |
| 5,991,739 A | * | 11/1999 | Cupps et al. .................. | 705/26 |
| 6,035,283 A | * | 3/2000 | Rofrano ....................... | 705/27 |
| 6,052,670 A | * | 4/2000 | Johnson ....................... | 705/27 |
| 6,070,149 A | * | 5/2000 | Tavor et al. .................. | 705/26 |
| 6,173,210 B1 | * | 1/2001 | Bjornson et al. ............. | 700/99 |
| 6,263,317 B1 | * | 7/2001 | Sharp et al. .................. | 705/26 |
| 6,282,517 B1 | * | 8/2001 | Wolfe et al. .................. | 705/26 |
| 6,295,528 B1 | * | 9/2001 | Marcus et al. ................ | 707/3 |
| 6,377,937 B1 | * | 4/2002 | Paskowitz .................... | 705/26 |
| 6,484,149 B1 | * | 11/2002 | Jammes et al. ............... | 705/26 |
| 2001/0032165 A1 | * | 10/2001 | Friend et al. ................. | 705/37 |
| 2001/0034656 A1 | * | 10/2001 | Lucas et al. .................. | 705/26 |
| 2001/0034726 A1 | * | 10/2001 | McMahon .................. | 705/400 |
| 2001/0044758 A1 | * | 11/2001 | Talib et al. ................... | 705/27 |
| 2002/0007333 A1 | * | 1/2002 | Scolnik et al. ................ | 705/37 |
| 2002/0016746 A1 | * | 2/2002 | McHenry et al. ............ | 705/26 |
| 2002/0029168 A1 | * | 3/2002 | McConnell, Jr. et al. ..... | 705/26 |
| 2002/0052803 A1 | * | 5/2002 | Amidhozour et al. ........ | 705/27 |
| 2002/0099623 A1 | * | 7/2002 | Yukino ........................ | 705/27 |
| 2002/0156688 A1 | * | 10/2002 | Horn et al. ................... | 705/26 |
| 2002/0198818 A1 | * | 12/2002 | Scott et al. ................... | 705/37 |

FOREIGN PATENT DOCUMENTS

| | | |
|---|---|---|
| WO | WO-99/52042 A2 * | 10/1999 |
| WO | WO-00/43933 A1 * | 7/2000 |

OTHER PUBLICATIONS

Anon., "Electronic Directory News Listings Suppliers Benefit from Proliferation of Internet Yellow Pages," Yellow Pages & Directory Report, vol. 13, No. 8, Apr. 23, 1997.*
Anon., "Electrically Conductive Adhesive Can Be Cured at Room Tempaerature," Electronic Design, vol. 48, No. 9, p. 144, Ma 1, 2000.*

* cited by examiner

Primary Examiner—Nicholas D. Rosen
(74) Attorney, Agent, or Firm—Steven C. Bauman

(57) ABSTRACT

An enterprise site and a method of operating same for supplying on-line information to a customer of a provider of specialty chemicals. The method and site provide on-line specialty chemical information for use in an application that the customer specifies by navigating through a hierarchy of related pages and screens. Additionally, the customer may identify distributors with a given radius.

18 Claims, 4 Drawing Sheets

*First Name *Last Name

*Company Name Title

Address *Industry
IndustrialProduction

City State *Postal Code (U.S. -5 digits only please)

*Phone Fax

*E-mail

*Describe Application:
*Please be as specific as possible*

31

30A

Submit  Reset

FIG. 3

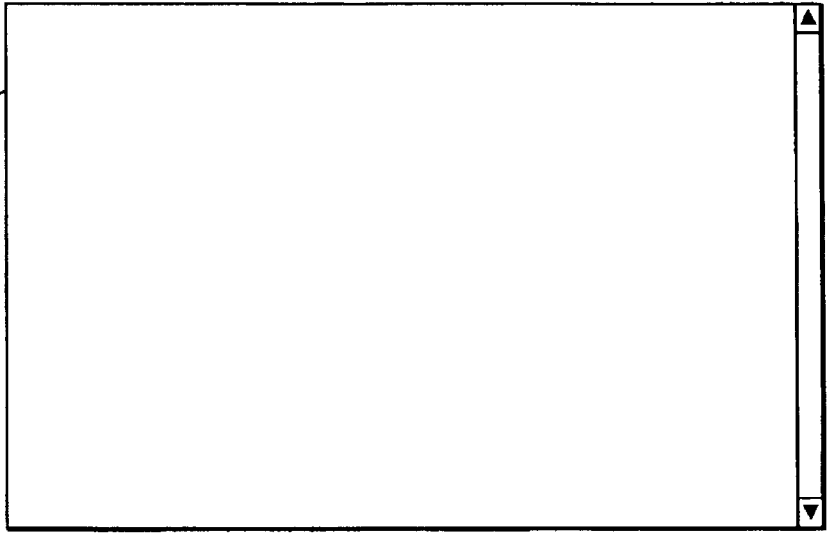

FIG. 4

Step 1. Select your Country: ● USA  Canada  Caribbean    30C

Step 2. Enter your Zip/Postal Code:[_____]  33A
US - Your 5 digit zip code
Canada first 3 digits of postal code (i.e.: L4W)    33B Step 3. Select Search Radius in miles (for US only): [ 25 ▼]
Canadian searches will find a distributor within a 3 digit postal code range.

Step 4. Optional: Enter five digit Item Number for Stocking Distributor
(for US only):    33C Note: If you do not find a US distributor when you search for a specific item number, try only using your zip code.

[Search]    FIG. 5

WEB SITE OFFERING SPECIALTY CHEMICALS SUCH AS ADHESIVES SEALANTS COATINGS LUBRICANTS CLEANERS AND RELATED EQUIPMENT IN CONJUNCTION WITH ACCESS TO PRODUCT SUPPORT AND PRODUCT USAGE INFORMATION

FIELD OF THE INVENTION

This invention relates generally to world wide web (WWW) sites of a type that describe goods and/or services and, more particularly, relates to a business-to-business (B2B) type of WWW site directed to providing information related to specialty chemicals, such as adhesives, sealants, coatings, lubricants and cleaners, as well as related equipment and services.

BACKGROUND OF THE INVENTION

The so-called B2B type of WWW (web) site has become an important advertising component of many manufacturing and/or service-related companies. The B2B web site enables a company to not only provide a comprehensive listing of its products and/or services, but to also provide a mechanism to offer related information, such as product sheets, application notes, technical literature and the like. A listing of distributors can also be provided.

SUMMARY OF THE INVENTION

This invention provides an improved B2B web site that provides on-line information related to specialty chemicals, such as adhesives, sealants, coatings, lubricants and cleaners, as well as related equipment and services.

This invention also provides a B2B web site that supplies on-line information in a hierarchical manner with a plurality of related pages enabling the customer to contact sales professionals and technical specialists from various levels within the hierarchy.

An enterprise site and a method of operating same is provided for supplying on-line information to a customer (or a potential customer) of a provider of specialty chemicals, including adhesives, sealants, coatings, lubricants and cleaners, as well as related equipment and services. The method includes a first step of (A) providing on-line specialty chemical information with a hierarchy of related pages and screens, the information including a list containing, preferably, a plurality of recommended specialty chemical products for use in an application that the customer specifies by navigating through the hierarchy of related pages and screens. A second step (B) enables the customer to specify a distance radius at each of the levels within the hierarchy of related pages and screens of the on-line specialty chemical information. A third step (C) operates in response to the specified distance radius, and provides the customer with a list of distributors of the specialty chemicals that lie within the specified radius.

The step (B) of enabling the customer to specify a distance radius further enables the customer to specify at least one specialty chemical product, and the step (C) of providing the customer with the list of distributors in this case provides the customer with a list of distributors, located within the specified distance radius, that stock the specified at least one specialty chemical product.

A further step enables the customer to contact sales professionals and technical specialists at each of the levels within the hierarchy of related pages and screens of the on-line specialty chemical information. This step further enables the customer to fill out and submit an on-line form including comments and/or questions entered by the customer, or a description of the intended application that is entered by the customer.

The hierarchy of related pages and screens of the on-line specialty chemical information preferably includes a Product Selector, where the customer is enabled to specify an intended use for a specialty chemical product. The intended use can be selected from one of Product Assembly; Plant and Equipment Maintenance and Repair; and Printed Circuit Board or Electronics Assembly. By selecting the Product Assembly intended use, the customer is enabled to further specify one of: Seal Microporosity or Pores in Surfaces; Seal or Lock a Threaded Assembly; Bond or Seal a Non-Threaded Assembly; Coat, Pot, or Encapsulate an Assembly; Clean a Surface for Better Bond Strength; and Lubricate an Assembly.

BRIEF DESCRIPTION OF THE DRAWINGS

The above set forth and other features of the invention are made more apparent in the ensuing Detailed Description of the Invention when read in conjunction with the attached Drawings, where:

FIG. 3 illustrates an input screen for a user to make an Application Assistance or Product Recommendation inquiry to a technical assistance center shown in FIG. 1;

FIG. 4 illustrates an input screen for a user to make a Contact a Local Sales Representative to Schedule a Consultation inquiry to a sales assistance center shown in FIG. 1; and FIG. 5 illustrates an input screen for a user to make a Distributor Location inquiry to a distributor locator center shown in FIG. 1.

DETAILED DESCRIPTION OF THE INVENTION

Figure 1:
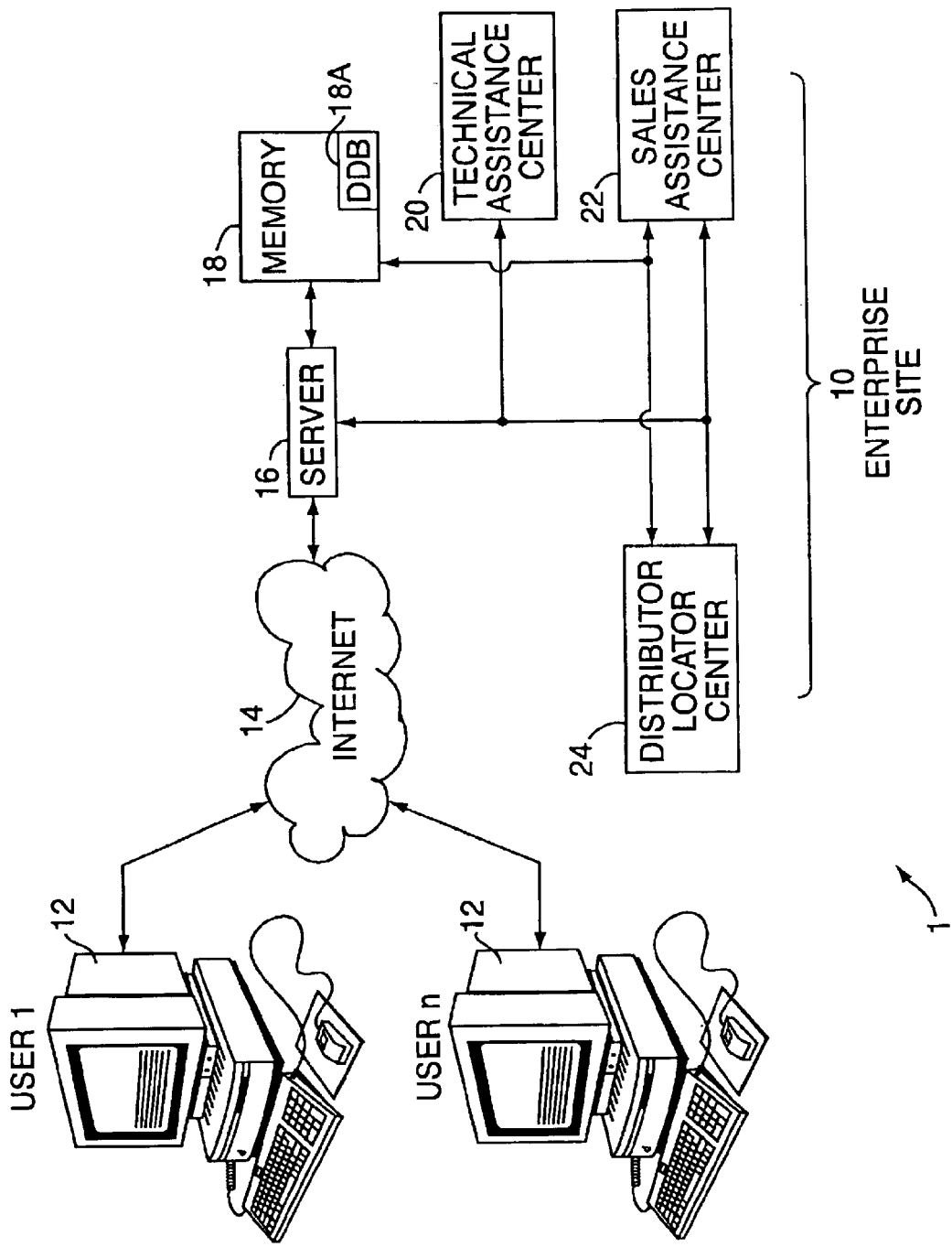
FIG. 1 is a simplified block diagram of a data processing system and data communications network that is suitable for implementing the teachings found herein.

FIG. 1 illustrates a simplified block diagram of a data processing system and data communications network, jointly referred to as system 1, that is suitable for implementing the teachings of this invention. A plurality of users 12 (User_1 through User_n) are assumed to be bidirectionally coupled to a global data communications network, typically the Internet 14, and are enabled to transmit and receive data packets using, typically, a TCP/IP protocol. The data packets are transmitted to and received from a server 16 located at an enterprise location or site 10, which could be an office of a manufacturer or provider of goods and services. While one server 16 is shown, those skilled in the art will recognize that a plurality of servers can be used, and that these servers can be sited at one location, or they may be widely distributed and remotely sited. For example, a plurality of distributed servers 16 can be used for servicing users 12 in different geographic locations, such as North America, Europe, Japan and Southeast Asia or, alternatively, a single server 16 can be used for servicing all of the users 12.

The users 12 are assumed, for the purposes of this invention, to include some capability, such as a keyboard, mouse or trackball, for navigating through a hierarchy of related pages and screens of on-line specialty chemical information that is presented to the user 12 from the enterprise site 10, via the server 16 and internet 14.

The enterprise site 10 preferably also includes a memory 18 that is bidirectionally coupled to the server 16 for storing data representing web pages, screens and page templates that are transmitted to the users 12, as well as other data as described below. In the preferred embodiment a technical assistance center 20, a sales assistance center 22 and a distributor locator center 24 are provided as well, and each is also bidirectionally coupled to the server 16.

In the presently preferred embodiment of this invention the business conducted at the enterprise location 10 is related to specialty chemicals, including adhesives, sealants, coatings, lubricants and cleaners, as well as related equipment and services, and the web pages, screens and page templates stored in the memory 18 relate, to these goods, as well as to technical information regarding these goods, such as technical data sheets, as well as to other types of technical literature, application notes and the like that are related to these goods.

When first entering the WWW site the user 12 is presented with a choice of WWW sites, including the United States, Australia, Sweden, Spain, Japan, Korea, etc. Each site provides the user with the appropriate language, as well as information that is pertinent to the particular region or country, such as information relating to local distributors, symposia, user groups, etc. Preferably, the user 12 is presented with a consistent visual experience regardless of the selected site.

After entering a desired site the user 12 is presented with a number of choices, such as Application Assistance, Browse Catalog, Distributor Locator, Datasheets, Literature, etc.

Figure 2:
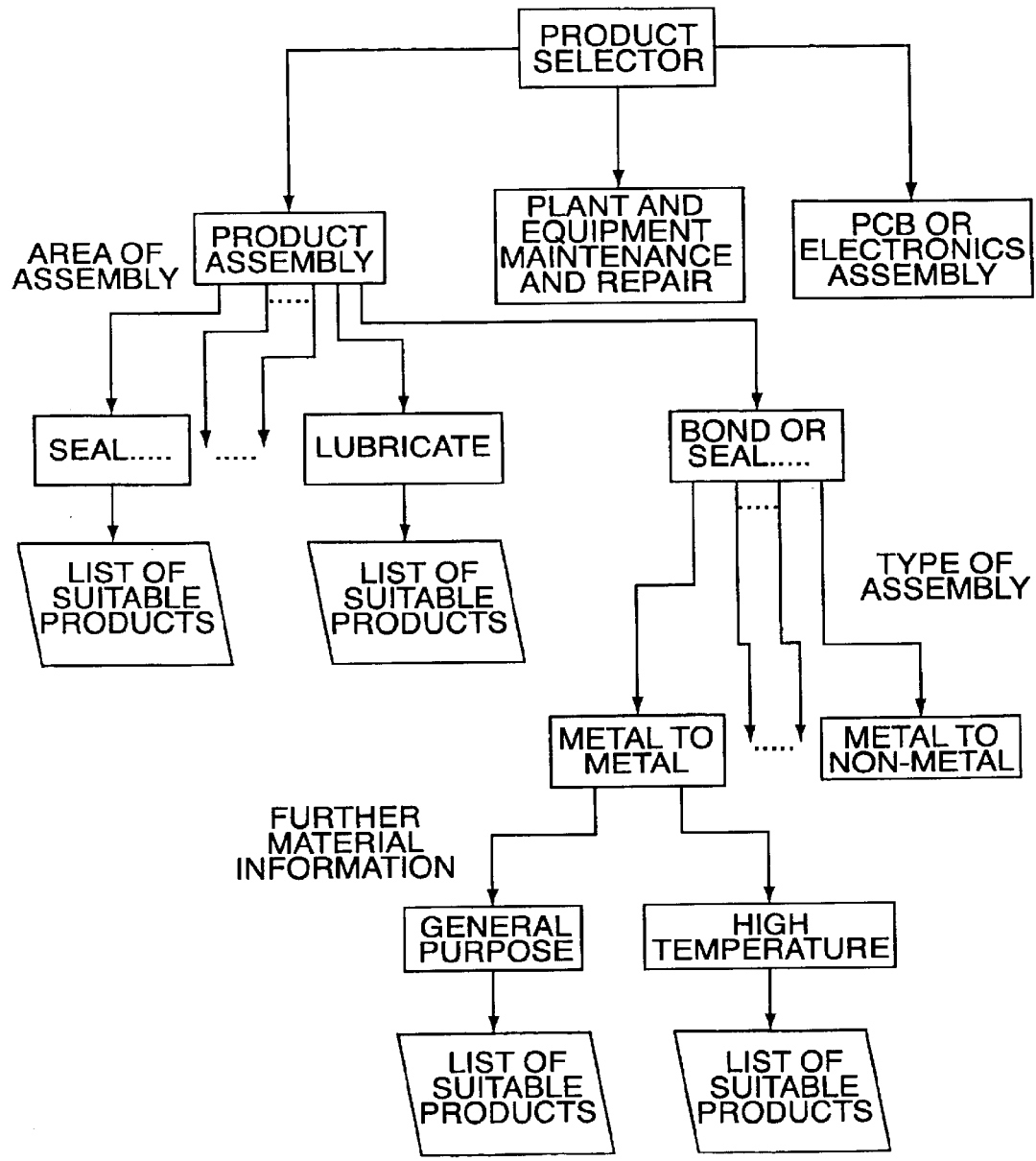
FIG. 2 depicts examples of a hierarchical arrangement of related web pages and screens.

When selecting the Application Assistance choice the user 12 enters a Product Selector, which is organized in a hierarchical manner and which is intended to provide the user 12, where possible, with a plurality of possible product selections that are appropriate for the user's requirements. In a preferred implementation the Product Selector operates as follows. Reference can also be made to FIG. 2.

Assume first that the user 12 is prompted to indicate one of a plurality of intended uses for the product. The intended uses can include: Product Assembly; Plant and Equipment Maintenance and Repair; and Printed Circuit Board or Electronics Assembly. By clicking on one of these selections, the user 12 enters the next, lower level of the Product Selector. Assuming for this example that the user 12 selected Product Assembly, the user 12 is then prompted to indicate an area of assembly, and is presented with choices such as: Seal Microporosity or Pores in Surfaces; Seal or Lock a Threaded Assembly; Bond or Seal a Non-Threaded Assembly; Coat, Pot, or Encapsulate an Assembly; Clean a Surface for Better Bond Strength; and Lubricate an Assembly.

By clicking on one of these selections, such as Seal Microporosity or Pores in Surfaces, the user 12 enters the next lower level of the hierarchical Product Selector and is presented with a list comprised of, preferably, a plurality of suitable products. The product information preferably includes, but is not limited to, the product number; a brief product description (such as a trade name); and information as to what type of documentation is available for the recommended products, where to buy the recommended products, and an ability to view the corresponding page(s) from the on-line catalog.

By clicking on another selection relevant to the area of assembly, such as the Bond or Seal a Non-Threaded Assembly selection, the user 12 is instead presented with a next lower level that requests further information regarding the intended application. In this example the next, lower level prompts the user to indicate what type of assembly is being bonded, and includes selections of: Bonding and Sealing Cylindrical Metal to Metal Assemblies; Bonding and Sealing Cylindrical Assemblies Where One Surface is Non-Metalic; Bonding All Other Assemblies; and Sealing or Gasketing All Other Assemblies.

If the user 12 selects, for example, Bonding and Sealing Cylindrical Metal to Metal Assemblies, then a next, lower level of the Product Selector is entered where the user 12 is again prompted for additional information, in this case: Select Material Appropriate for your Cylindrical Assembly, and is given choices between: General Purpose or High Temperature. Only after selecting one of these two choices is the user 12 presented with a list of Recommended Products for the intended application.

As should be apparent, the number of levels of the hierarchical Product Selector is not fixed, but is a function of the type of application. That is, in order to select a list of Recommended Products for the user 12, the enterprise system 10 may require more or less information from the user 12, depending on the user's intended application.

In accordance with an aspect of these teachings, at all of the displayed levels, as well as when the list of Recommended Products is displayed, the user 12 is presented with an opportunity to close the product selection loop. This is accomplished by providing the user with the ability to select one or more of the following: Contact the Manufacturer for Technical Assistance and Product Usage Information; Contact a Local Sales Representative to Schedule a Consultation; and Contact a Local Distributor.

By selecting the Contact the Manufacturer for Technical Assistance and Product Usage choice, the user 12 is presented with a forms 30A to be filled out (FIG. 3). The form 30A includes a field 31 wherein the user 12 is enabled to describe the intended application in further detail. The completed form is then sent to the technical assistance center 20 for review by a human or an automated expert, who can then contact the user 12 with further information regarding recommended products for the user's application. For the case where no one existing product meets all of the user's application requirements, the user 12 can instead be contacted with information regarding the capacity of the manufacturer to provide a custom product formulation for the user's intended application.

By instead selecting the Contact a Local Sales Representative to Schedule a Consultation choice, the user 12 is presented with another form 30B to be filled out (FIG. 4). The form 30B includes a field 32 wherein the user 12 is enabled to provide detailed Comments/Questions regarding the intended application. The completed form is in this case sent to the sales assistance center 22 for review by a human or automated expert, who can then contact the user 12 with an answer to any questions, a response to any comments, as well as recommendations regarding a possible on-site consultation, the availability of samples, the availability of technical documentation related to the same or a similar application, etc.

By instead selecting the Contact a Local Distributor choice, the user 12 is presented with a different form 30C to be filled out (FIG. 5). This form includes a ZIP/Postal Code field 33A, as well as a Select Search Radius field 33B. An optional Item Number field 33C is also provided to enable the user 12 to enter a product identifier so that a stocking distributor can be quickly located. The Select Search Radius field 33B enables the user 12 to select one of a plurality of choices, such as 5 miles, 10 miles, 25 miles (default), 40 miles and 50 miles. Based on the entered ZIP/Postal Code field 33A, and on the user-specified search radius, the distributor locator center 24 is enabled to generate a list of product distributors within the specified radius. If the optional Item Number field 33C was also filled in by the user 12, then the distributor locator center 24 is enabled to parse the list of distributors so as to include only those that are stocking distributors for the specified product.

It is within the scope of these teachings to automatically fill in one or more Item Numbers into the Item Number field 33C at the Product Selector level where the list of Recommended Products is displayed to the user 12. In this case, when the user selects the Contact a Local Distributor choice, the displayed list of Distributors (i.e., those Distributors within the specified or default radius 33B) will automatically contain one or more stocking distributors for one or more Item Numbers corresponding to the list of Recommended Products for the application specified by the user 12.

The list of distributors is derived from a distributor database (DDB) 18A stored in the memory 18, where the DDB 18A includes the names and contact information for all distributors (worldwide or only those in local region served by the WWW site), and preferably also includes an indication of the products stocked by each distributor. Conventional mapping software, keyed from ZIP or Postal codes, can be employed to determine the identities of those distributors that are located within the specified radius 30C.

In a presently preferred, but not limiting, embodiment of these teachings the distributor locator center 24 identifies a particular distributor as being a stocking distributor if the distributor has ordered a user-specified item (e.g., a particular adhesive or sealant) within some predetermined period of time, such as within the last three months. This information may be found in the distributor database (DDB) 18A stored in the memory 18. In this manner the user or customer is provided a list of distributors having a higher probability of actually having a desired item in stock.

It should be apparent that the foregoing description has been made in the context of presently preferred embodiments of this invention, and thus the various specifically described site choices, such as Application Assistance; Browse Catalog; Distributor Locator; Datasheets; Literature; etc., the various intended product uses, such as Product Assembly; Plant and Equipment Maintenance and Repair; and Printed Circuit Board or Electronics Assembly, and the various sub-choices under intended product uses, such as Seal Microporosity or Pores in Surfaces; Seal or Lock a Threaded Assembly; Bond or Seal a Non-Threaded Assembly; Coat, Pot, or Encapsulate an Assembly; Clean a Surface for Better Bond Strength; and Lubricate an Assembly, are all exemplary, and are not to be construed in a limiting sense upon the teachings found herein. In like manner, the specifics given above as to the Contact the Manufacturer for Technical Assistance and Product Usage choice, the Contact a Local Sales Representative to Schedule a Consultation choice, and the Contact a Local Distributor choice, and their respective user input forms 30A, 30B and 30C (FIGS. 3–5), are also exemplary, and are not intended to be construed in a limiting sense upon the practice of the teachings of this invention.

The teachings of this invention are, also not limited to only B2B types of enterprise sites, but apply as well to business to consumer enterprise sites.

Also, while the invention has been described primarily in the context of industrial applications, the teachings of this invention relate as well to the automotive aftermarket, as well as to the biomedical and medical device markets, among others.

Thus, while the invention has been particularly shown and described with respect to preferred embodiments thereof, it will be understood by those skilled in the art that changes in form and details may be made therein without departing from the scope and spirit of the invention, which is defined by the claims that follow.

What is claimed is:

1. A method for providing on-line information to a customer of a provider of specialty chemicals, including adhesives, sealants, coatings, lubricants and cleaners, as well as related equipment and services, comprising steps of:

providing on-line specialty chemical information with a hierarchy of related pages and screens, the information including a list comprised of a plurality of recommended specialty chemical products for use in an application that the customer specifies by navigating through the hierarchy of related pages and screens;

enabling the customer to specify a distance radius at each of the levels within the hierarchy of related pages and screens of the on-line specialty chemical information; and in response to a specified distance radius, providing the customer with a list of distributors of the specialty chemicals that lie within the specified radius, wherein a distributor on said list of distributors is identified from a database as a distributor who is recorded as having ordered, within a predetermined period of time, a specialty chemical that is specified by the customer.

2. A method as in claim 1, wherein the step of enabling the customer to specify a distance radius further enables the customer to specify at least one specialty chemical product, and wherein the step of providing the customer with the list of distributors provides the customer with a list of distributors, located within the specified distance radius, that stock the specified at least one specialty chemical product.

3. A method as in claim 1, and further comprising a step of enabling the customer to contact sales professionals and technical specialists at each of the levels within the hierarchy of related pages and screens of the on-line specialty chemical information.

4. A method as in claim 3, where the step of enabling the customer to contact sales professionals includes a step of enabling the customer to fill out and submit an on-line form including comments and/or questions entered by the customer.

5. A method as in claim 3, where the step of enabling the customer to contact technical specialists includes a step of enabling the customer to fill out and submit an on-line form including a description of the intended application that is entered by the customer.

6. A method as in claim 1, wherein the hierarchy of related pages and screens of the on-line specialty chemical information comprises a Product Selector wherein the customer is enabled to specify an intended use for a specialty chemical product, wherein the intended use comprises one of Product Assembly; Plant and Equipment Maintenance and Repair; and Printed Circuit Board or Electronics Assembly.

7. A method as in claim 6, wherein by selecting the Product Assembly intended use, the customer is enabled to further specify one of Seal Microporosity or Pores in Surfaces; Seal or Lock a Threaded Assembly; Bond or Seal a Non-Threaded Assembly; Coat, Pot, or Encapsulate an Assembly; Clean a Surface for Better Bond Strength; and Lubricate an Assembly.

8. An enterprise site for providing on-line information to a customer of a provider of specialty chemicals, including adhesives, sealants, coatings, lubricants and cleaners, as well as related equipment and services, comprising:

a server coupled to a data communications network for providing to customers on-line specialty chemical information with a hierarchy of related pages and screens, the information including a list comprised of a plurality of recommended specialty chemical products for use in an application that the customer specifies by navigating through the hierarchy of related pages and screens;

at least some of said pages and screens enabling the customer to specify a distance radius at each of the levels within the hierarchy of related pages and screens of the on-line specialty chemical information; and said enterprise site is responsive to a specified distance radius, for providing the customer with a list of distributors of the specialty chemicals that lie within the specified radius, and for providing the customer with a list of distributors who ordered, within a predetermined period of time, a specialty chemical that is specified by the customer.

9. An enterprise site as in claim 8, wherein the customer is further enabled to specify at least one specialty chemical product, and wherein said enterprise site in response provides the customer with a list of distributors, located within the specified distance radius, that stock the specified at least one specialty chemical product.

10. An enterprise site as in claim 8, and further comprising means for enabling the customer to contact sales professionals and technical specialists at each of the levels within the hierarchy of related pages and screens of the on-line specialty chemical information.

11. An enterprise site as in claim 10, where said means for enabling the customer to contact sales professionals enables the customer to fill out and submit an on-line form including comments and/or questions entered by the customer.

12. An enterprise site as in claim 10, where said means for enabling the customer to contact technical specialists enables the customer to fill out and submit an on-line form including a description of the intended application that is entered by the customer.

13. An enterprise site as in claim 8, wherein the hierarchy of related pages and screens of the on-line specialty chemical information comprises a Product Selector wherein the customer is enabled to specify an intended use for a specialty chemical product, wherein the intended use comprises one of Product Assembly; Plant and Equipment Maintenance and Repair; and Printed Circuit Board or Electronics Assembly.

14. An enterprise site as in claim 13, wherein by selecting the Product Assembly intended use, the customer is enabled to further specify one of Seal Microporosity or Pores in Surfaces; Seal or Lock a Threaded Assembly; Bond or Seal a Non-Threaded Assembly; Coat, Pot, or Encapsulate an Assembly; Clean a Surface for Better Bond Strength; and Lubricate an Assembly.

15. An enterprise site as in claim 8, wherein said data communications network is a global data communications network.

16. An enterprise site as in claim 8, wherein said data communications network comprises the Internet.

17. An enterprise site for providing on-line information to a customer of a provider of specialty chemicals, including adhesives, sealants, coatings, lubricants and cleaners, as well as related equipment and services, comprising:

a server coupled to a data communications network for providing to customers on-line specialty chemical information with a hierarchy of related pages and screens, the information including a list comprised of a plurality of recommended specialty chemical products for use in an application that the customer specifies by navigating through the hierarchy of related pages and screens;

at least some of said pages and screens enabling the customer to specify a distance radius at each of the levels within the hierarchy of related pages and screens of the on-line specialty chemical information, and further enabling the customer to specify at least one specialty chemical product; and said enterprise site is responsive to a specified distance radius, for providing the customer with a list of stocking distributors of a specified specialty chemical, that lie within the specified radius, wherein a stocking distributor is identified from a database as a distributor who is recorded as having ordered, within a predetermined period of time, a specialty chemical that is specified by the customer.

18. An enterprise site as in claim 17, wherein the predetermined period of time is three months.

* * * * *